United States Patent [19]
Odintsov

[11] Patent Number: 5,857,282
[45] Date of Patent: Jan. 12, 1999

[54] SYSTEM AND METHOD FOR REMOVING INSECTS FROM A FIELD

[76] Inventor: Vladimir Stepanovich Odintsov, 156 Prophsoyuenaya St., B. 1, Apt. 333, Moscow, Russian Federation

[21] Appl. No.: 825,330

[22] Filed: Mar. 28, 1997

[51] Int. Cl.⁶ .................................................. A01M 1/04
[52] U.S. Cl. ................................. 43/1; 43/113; 43/132.1
[58] Field of Search .................. 43/1, 113, 132.1; 362/35, 62, 66, 210, 227, 231, 253, 259, 805; 430/945

[56] References Cited

U.S. PATENT DOCUMENTS

| | | | |
|---|---|---|---|
| 1,819,551 | 8/1931 | Gourdon . | |
| 2,182,230 | 12/1939 | Hoffman . | |
| 2,848,837 | 8/1958 | Hanson et al. . | |
| 3,239,960 | 3/1966 | Stevens . | |
| 3,319,374 | 5/1967 | Gawne . | |
| 3,487,557 | 1/1970 | Sexton . | |
| 3,813,536 | 5/1974 | Kempkes | 240/67 |
| 4,183,077 | 1/1980 | Arnold | 362/224 |
| 4,271,878 | 6/1981 | Bologa . | |
| 4,339,789 | 7/1982 | Husby et al. | 362/259 |
| 4,916,445 | 4/1990 | Crossley | 340/946 |
| 5,343,376 | 8/1994 | Huang | 362/259 |
| 5,343,652 | 9/1994 | Johnson | 43/132.1 |
| 5,519,590 | 5/1996 | Crookham et al. | 362/62 |

OTHER PUBLICATIONS

*Artificial Lighting for Bollworm Control*, Stanley J. Nemec, undated.

*Influence of Lunar Phases on Generation and Population Cycles of the Bollworm, Heliothis Zea (Boddie)*, Stanley Joseph Nemec, dissertation, Dec. 1972.

Primary Examiner—Robert P. Swiatek
Assistant Examiner—James S. Bergin
Attorney, Agent, or Firm—Kolisch, Hartwell, Dickinson, McCormack & Heuser

[57] ABSTRACT

A system and method for clearing insects from a field is described. The method involves superimposing and projecting a plurality of scanning light beams across a field. The beams effectively form a single aggregate beam which scans across the field, thereby attracting pests, and dumping the pests in an area away from the field.

11 Claims, 2 Drawing Sheets

SYSTEM AND METHOD FOR REMOVING INSECTS FROM A FIELD

The invention relates to methods of removing insects from a field. In particular, the invention involves a technique for using a scanning beam of light to attract and move insects from a field to an area off the field, thus protecting crops from being consumed or otherwise damaged by the insects.

BACKGROUND OF THE INVENTION

Protection of agricultural crops from harmful pests, insects, moths, etc. has been an important and widely recognized problem for many years. One approach for addressing the problem is to treat the crops with insecticides, i.e., chemicals, which kill or repel pests. However, there are numerous problems with employing insecticides on agricultural crops. First, some pests such as moths go through stages in their development when they do not need nourishment and are therefore practically immune to most chemical and biological pesticide agents. Second, insecticides are sometimes harmful to animals and humans who may consume the crop materials after they are harvested. Further, in recent years the use of insecticides on crops has become heavily criticized as people have gained greater understanding about toxicology and carcinogenicity. Accordingly, alternative techniques for protecting crops from harmful pests or insects, which do not involve application of chemicals to the crops, are highly desirable and preferred.

Most ecologically safe methods of exterminating insects, including nocturnal and crepuscular moths, the most damaging pests of cotton, tobacco and some other agricultural crops, are based on the use of light traps with point sources of light. For example, see U.S. Pat. No. 2,182,230, No. 2,848,837, No. 3,319,374, No. 3,487,577; United Kingdom Patent No. 1,119,478; and French Patents No. 1,114,048 and No. 1,571,436. The methods disclosed in these patents allow an operator to catch and eliminate insect pests in a radius of not more than about 1,000 feet from the point source of light. To carry out these methods, an operator must install a number of light traps for the protection of cotton, tobacco or tea plantations. The methods require an extensive layout or network of electric wires among the plants, which interferes with or impedes agrotechnical cultivation.

The inventor on this patent has previously developed a technique for clearing insects from a field which employs light in a manner that does not require a complicated network of wires or a multitude of light sources. The inventor's prior invention is an ecologically clean method of clearing nocturnal and crepuscular moths, insect pests, from agricultural plantations. The method does not interfere with the cultivation of the plants. The method is disclosed in Russian Patent No. 2,038,783, which is attached as Exhibit A and is hereby incorporated by reference. The method involves trapping the moths in the period, preceding the evacuation of eggs, inside a scanning light beam which is about two miles long and generated by a search light on a mobile platform. The light beam first attracts the moths and moves them to an area outside the plantation, then forces them to evacuate eggs in an unfavorable environment. Consequently, the eggs perish.

However, a problem with the prior scanning beam method is that the phototropic property of the light beam diminishes with the diffusion of light. The beam has a form of a cone of approximately six feet in diameter at the source of light and about fifty feet at its end. The end of the light beam at the far end of the field which is being treated is less effective in trapping the moths.

Thus, an important object of the present invention is to provide a nonchemical method for clearing insects from an agricultural field. The method should not require a complex network of wires or a large number of light sources. The devices used in the method should not interfere or impede agrotechnical cultivation. Another important object of the invention is to provide a method which is effective for clearing insects from a field at the distal end of the light source, for example, as far as two miles from the light source.

SUMMARY OF THE INVENTION

The invention provides an ecologically clean method and technology for eliminating nocturnal and crepuscular moths, insect pests, which are harmful to valuable agricultural crops, for example, cotton, tobacco, tea, sugar cane, etc. The method provides a way of attracting moths into a single light beam, generated by two light aggregates derived from sources on mobile platforms, with a laser beam contained in one of the light beams to achieve a maximum phototactic effect on the moths. The moths are trapped inside the light beam and moved with the beam away from the plantation that is being treated, and thrown off onto the ground outside the plantation. Consequently, the eggs are evacuated in an unfavorable environment, thus losing their vitality and perishing.

The present invention is a significant advance beyond the inventor's prior light scanning techniques. The present invention employs at least two search lights mounted on mobile platforms in such a manner that the scanning beam from each source is superimposed on the other resulting in a single beam which is effective for attracting and clearing moths from a field over a distance of up to approximately two miles from the light sources. The invention also provides for superimposing a laser beam in the combined beam to enhance or strengthen the phototropical properties.

A Russian patent application on the present invention was filed on Jun. 20, 1996. A copy of the Russian application is attached as Exhibit B and is hereby incorporated by reference.

DESCRIPTION OF THE INVENTION

The present invention provides an ecologically safe method of cleaning fields such as agricultural crops, in particular, cotton, tobacco, tea and sugar cane, from moth pests when they are in a stage of their development when they do not need nourishment and are therefore completely immune to chemical and biological pesticide agents. The method is designed to prevent the moth, a carrier of 500 and sometimes even more eggs, from evacuating the eggs on the leaves of the plants.

The method and its technology allow treatment of large agricultural plantations which grow cotton, tobacco, sugar cane, tea and other valuable crops, so that the crops are substantially clean from insect pests. The method avoids any use of pesticides and does not interfere with the agrotechnical cultivation of the plants.

Figure 1:
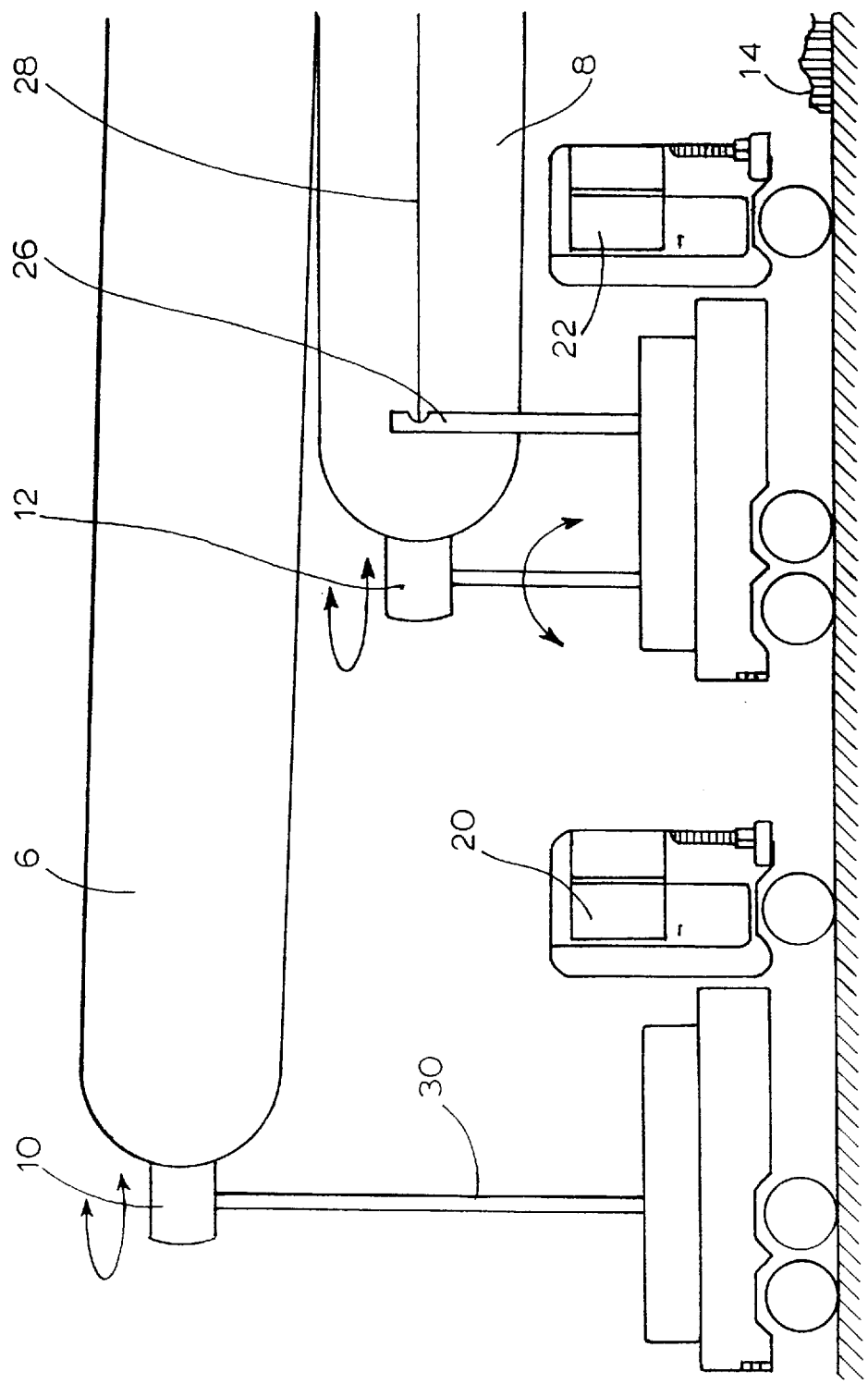
FIG. 1 is a schematic side view of a light scanning system used to perform a preferred method of the present invention.

A preferred embodiment of the invention employs two search lights mounted on mobile platforms positioned at different levels, for example, as shown in FIG. 1. FIG. 1 shows two light beams 6 and 8 generated by light sources 10 and 12, respectively. Beams 6 and 8 project over field or crop 14. As shown in FIG. 1, scanning light source 10 is positioned above scanning light source 12 so, at their proximal ends, beams 6 and 8 are separate and distinct. However, beams 6 and 8 are aimed in such a way that they combine and superimpose on each other near their points of origin so that beams 6 and 8 substantially combine to form a single beam over the majority of their path across field 14. Beams 6 and 8 could also be positioned at the same level, however, side-by-side.

As shown in FIG. 1, each light source is mounted on a mobile platform, for example, a truck. Scanning light source 10 is mounted on truck 20. Scanning light source 12 is mounted on truck 22. The light sources could also be mounted on a single mobile platform.

Truck 22 supports a second light source 26 for generating laser beam 28 which is contained within scanning light beam 8.

As shown in FIG. 1, scanning light beams 6 and 8 are positioned in such a manner that they produce jointly and substantially a single radial non-diffuse light beam which is about two miles long. Back light source 10 includes elevating gear 30 to allow beam 6 to begin at an elevated point but to be substantially superimposed on front search light beam 8. As already noted, front mobile platform 22 is equipped with laser light source 26 for generating radial laser beam 28. Laser beam 28 preferably includes light of approximately 360 nm throughout its length. Inclusion of laser beam 28 strengthens and enhances the phototropic properties of the system. The light sources are selected with the objective of minimizing the extent or degree of horizontal diffusion over the approximate two mile path of the beams.

Figure 2:
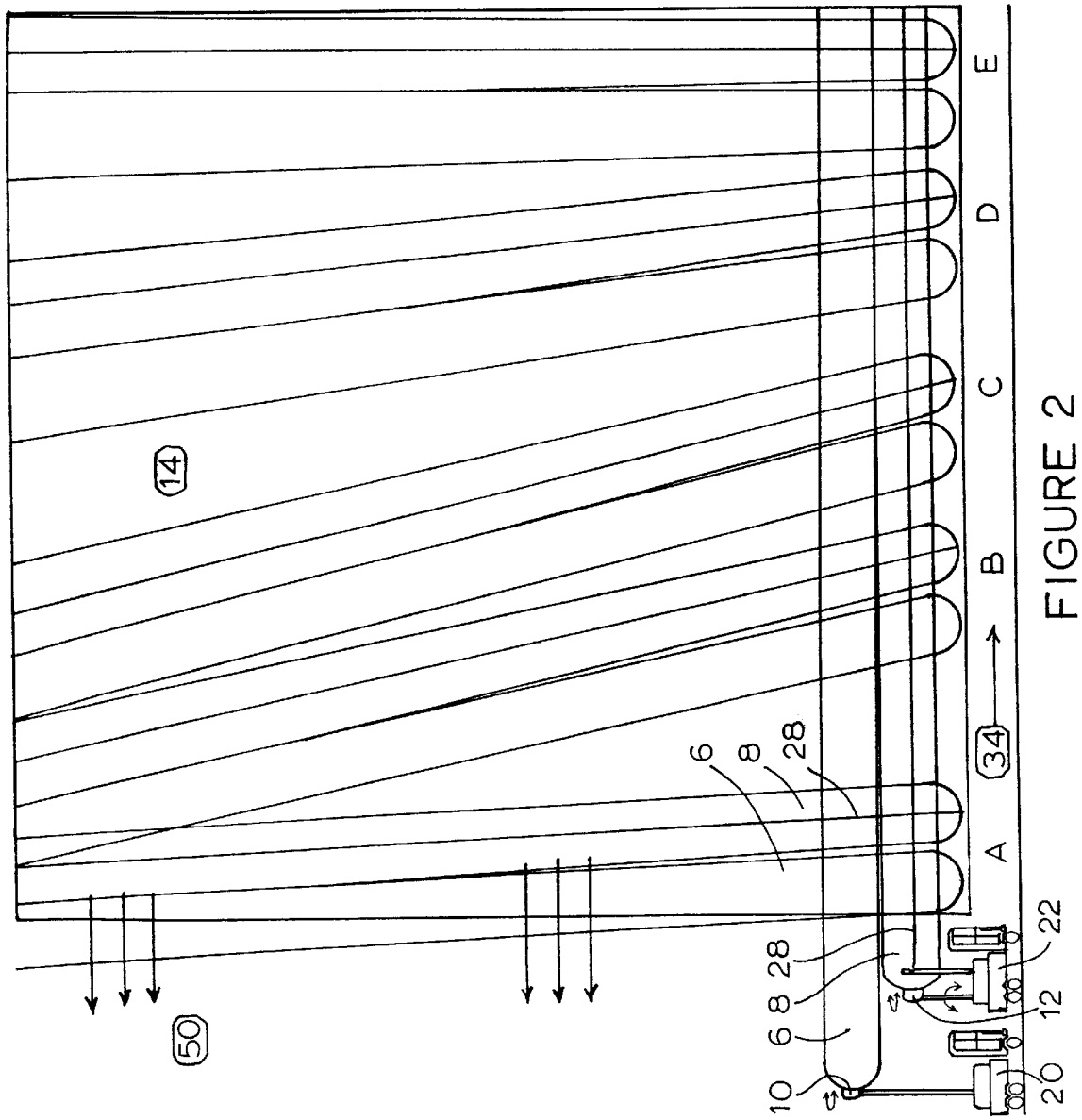
FIG. 2 is another schematic side view of the system shown in FIG. 1, and additionally, illustrating light scanning paths over a field.

FIG. 2 shows the light scanning system and equipment illustrated in FIG. 1, as it relates to scanning light paths across field 14. Mobile platforms 20 and 22 travel along path 34 adjacent to field 14. A series of scans are performed at positions A–E along the side of field 14. FIG. 2 shows, for each position A–E, the horizontal paths of scanning beams 6 and 8, and also laser beam 28. At the end of each scan cycle, insects are dumped in area 50 away and off of field 14.

Treatment of cotton, tobacco and other plantations is timed to coincide with the period when the eggs inside the moths reach full maturity. The positions A through E for the two mobile light aggregates are chosen during daylight. After sunset they are positioned at the plantations side, for example, along path 34 in FIG. 2. The two search lights and the laser device are switched on, and the light beams are projected over the plantation at a height preferably of about 3–4.5 feet above ground. The light beam which has the ultraviolet wavelengths between approximately 360–380 nm, traps the moths, before they are able to evacuate eggs on the leaves of the plants, and keeps them inside the beams, despite its movement and changing position. The operator "under cuts" the plants with sharp movements of the light beam to absorb or attract the moths more intensively. The positions of the light aggregates or sources are changed in order to treat the next section of the plantation or field, as shown in FIG. 2. After the whole plantation has been treated in the manner described above, and cleared of moths, the light beam which includes the moths is moved away from the plantation to its side, for example, area 50 in FIG. 2, where it is lowered sharply onto the road, an irrigation ditch or lucerne field. Consequently, the moths are compelled to evacuate eggs into the unfavorable environment where they lose their vitality and perish.

A one-time treatment of the plantation by this method is economical and effective. In plantations of cotton and sugar cane (in conditions of Uzbekistan) and tobacco (in Krasnodar region in the northern Caucasus), treated by this method, there was no increase in the number of eggs of *Helicthis obsoleta* and other moths compared to the negligible (1–3 per 100 plants) initial number which were found before treatment. In the untreated control plantations, eggs were found in numbers which threatened the crops (18–22 per 100 plants). The described method is also effective against *Laspeyresia ponomella*, which is a common pest of apple and pear trees. The practical effect of cleaning, by this method, cotton, tobacco and sugar cane plantations is maintained during the next three years after the treatment.

Preferred embodiments of the invention have been described above. However, many other variations may be successfully practiced without departing from the basic concepts of the invention, as recited in the claims below.

I claim:

1. A method of clearing insects from a field comprising the steps of:

sweeping a space above a field with a first beam of light, and at least partially superimposing a second beam of light on the first beam during the sweeping step, and depositing insects attracted by the beams in an area off the field.

2. The method of claim 1 further comprising the step of directing the beams toward an area off the field so that insects who are attracted from the field toward the beams are deposited in the area off the field.

3. The method of claim 1 further comprising the step of including a laser beam in one of said beams of light.

4. The method of claim 1 further comprising positioning the source for the first beam of light close to the source for the second beam of light so that the beams can maximally coincide during the sweeping step.

5. The method of claim 1 further comprising the steps of positioning the source for the first beam of light on a first vehicle, positioning the source for the second beam of light on a second vehicle, and positioning the vehicles close to each other during the sweeping step.

6. The method of claim 5 further comprising positioning the source for the first beam of light below the source for the second beam of light, and positioning the first vehicle in front of the second vehicle relative to the field, during the sweeping step.

7. The method of claim 6 further comprising including a laser beam in the first beam of light during the sweeping step.

8. The method of claim 6 further comprising positioning the first beam of light so that it is substantially parallel to the ground and approximately 3–5 feet above the ground during the sweeping step.

9. The method of claim 1 further comprising producing light including wavelengths of 360–380 nanometers in the first beam of light.

10. A method of clearing insects from a field comprising the steps of:

sweeping a space above a field with a first beam of light, including a laser beam in the first beam of light during the sweeping step, and depositing insects attracted by the beam in an area off the field.

11. The method of claim 10 further comprising the step of at least partially superimposing a second beam of light on the first beam during the sweeping step.

\* \* \* \* \*